(12) United States Patent
Nishide et al.

(10) Patent No.: US 7,952,628 B2
(45) Date of Patent: May 31, 2011

(54) SOLID-STATE IMAGING DEVICE AND IMAGING APPARATUS

(75) Inventors: Tsutomu Nishide, Kanagawa (JP); Akihiko Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 443 days.

(21) Appl. No.: 12/235,109

(22) Filed: Sep. 22, 2008

(65) Prior Publication Data

US 2009/0086076 A1   Apr. 2, 2009

(30) Foreign Application Priority Data

Sep. 28, 2007   (JP) ................................. 2007-254339

(51) Int. Cl.
*H04N 5/335* (2006.01)
*H04N 3/14* (2006.01)

(52) U.S. Cl. ........ 348/294; 348/297; 348/300; 348/302; 348/312

(58) Field of Classification Search .................. 348/294, 348/297, 209, 300, 302, 304, 312; 250/208.1; 257/290–292
See application file for complete search history.

(56) References Cited

U.S. PATENT DOCUMENTS

| 5,144,445 A * | 9/1992 | Higashitsutsumi ........... 348/294 |
| 6,727,957 B1 * | 4/2004 | Sato .............................. 348/526 |
| 2005/0068286 A1 * | 3/2005 | Morita .......................... 345/100 |

FOREIGN PATENT DOCUMENTS

JP   2002-209149   7/2002

* cited by examiner

*Primary Examiner* — Yogesh K Aggarwal
(74) *Attorney, Agent, or Firm* — SNR Denton US LLP (57) ABSTRACT

A solid-state imaging device includes a reflection timing control signal output unit, a data holding unit, and a collective-reflection processing unit. The reflection timing control signal output unit outputs a reflection timing control signal for controlling a timing of outputting operation setting data. The data holding unit latches the operation setting data inputted from outside and outputs the operation setting data. The collective-reflection processing unit collectively latches the operation setting data in synchronism with the reflection timing control signal, and outputs the latched operation setting data to a driving section. The reflection timing control signal output unit receives a vertical synchronization signal and an end-of-communication signal representative of an end of communication of a series of operation setting data from outside, and outputs the reflection timing control signal to the collective-reflection processing unit in synchronism with the vertical synchronization signal after the end-of-communication signal is received.

4 Claims, 5 Drawing Sheets

SOLID-STATE IMAGING DEVICE AND IMAGING APPARATUS

CROSS-REFERENCE TO RELATED APPLICATIONS

The present application claims benefit of priority of Japanese patent Application No. 2007-254339 filed in the Japanese Patent Office on Sep. 28, 2007, the entire disclosure of which is incorporated herein by reference.

BACKGROUND OF THE INVENTION

1. Field of the Invention

The present invention relates to a solid-state imaging device which sets a series of operation setting data at once, and an imaging apparatus using the solid-state imaging device.

2. Description of Related Art

As complementary metal-oxide semiconductor(CMOS) image sensors have become widespread, a timing generator (TG), an analog front end(AFE), a digital circuit, and the like, which are constructed as a separate chip in a charge-coupled device(CCD) image sensor, are integrated into one chip. With the one-chip construction, the CMOS image sensors become multifunctional, it becomes necessary to set operation settings, such as various mode transitions, image processing with high-function, and operation switching from low-speed to high-speed, by a large number of registers.

In a known operation setting, so as not to adversely affect the operation, the operation setting is performed as follows. For example, communication of the setting data is performed within a period whose start and end are defined in synchronism with starting pulse signals (a horizontal transfer pulse, a vertical transfer pulse) of frames (see Japanese Unexamined Patent Application Publication No. 2002-209149), since a setting change for accumulation time causes that an image is distorted unless the setting change is conducted at the frame start.

Figure 7:
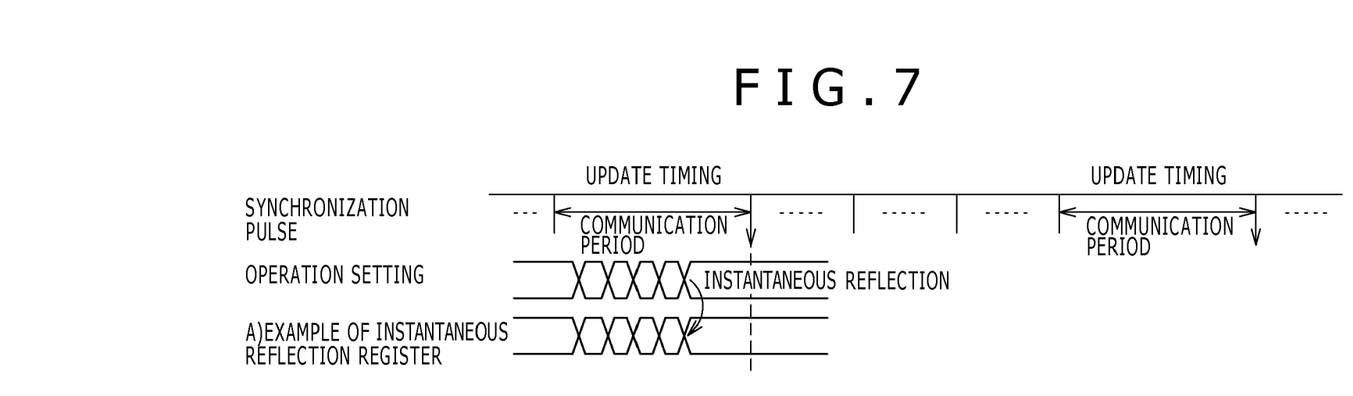
FIG. 7 illustrates a timing diagram showing a known method of setting a timing for reflecting an operation setting.
Figure 8:
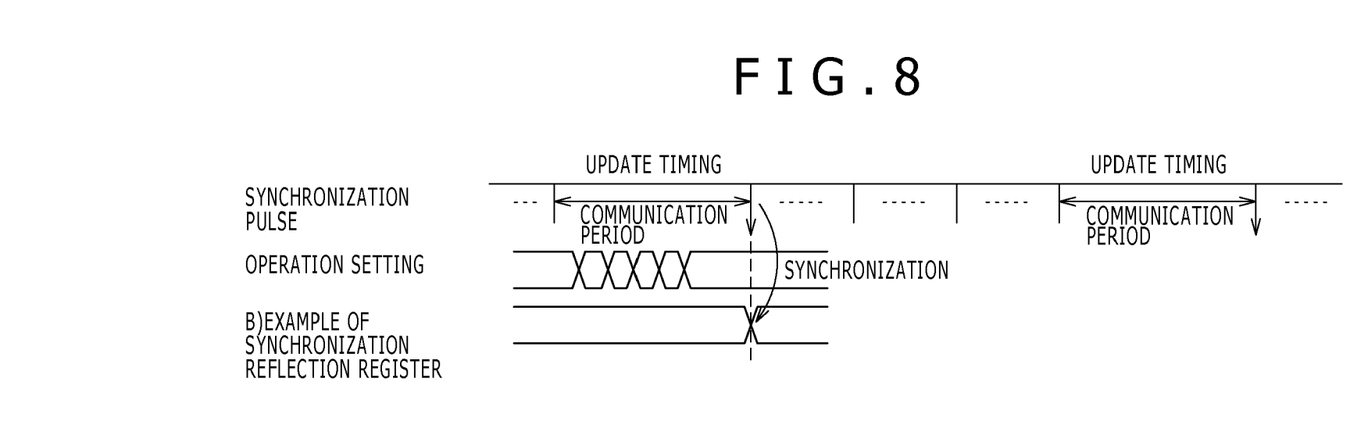
FIG. 8 illustrates a timing diagram showing a known method of setting a timing for reflecting an operation setting.

As a method of setting a timing for reflecting an operation setting, there are methods: one method (instantaneous reflection) in which the setting of registers is reflected instantaneously every time a register is set within a communication period as shown in FIG. 7, and another method (synchronization) in which the register setting is held until the end of a communication period and reflected in synchronism with an update timing by a pulse signal, as shown in FIG. 8.

SUMMARY OF THE INVENTION

However, in a known solid-state imaging device, the communication period for the setting of registers is synchronized with the update timing by a pulse signal. As a result, an issue has arisen that the register settings which could be performed within the communication period are small in number. The communication period may otherwise be extended by retarding the update timing defined by a synchronization pulse signal, but this retards the frame rate, so that it is undesirable in terms of operations. If a large amount of setting data is transmitted so that that the setting of all the registers is not completed within the communication period, the setting of remaining registers is not reflected in a next frame, so that it is necessary to wait for a next communication period for reflection. In this case, invalid frames occur until all the register settings are reflected. For example, if a plurality of frames are required for register setting of a single function, invalid frames may occur.

Accordingly, it is desirable to provide a solid-state imaging device capable of performing a large amount of register settings under no limits on the communication period and causing no invalid frames.

In accordance with one embodiment of the present invention, there is provided a solid-state imaging device which includes a reflection timing control signal output unit, a data holding unit, and a collective-reflection processing unit. The reflection timing control signal outputs a reflection timing control signal for controlling a timing of outputting operation setting data for a device to a driving section of the device. The data holding unit latches the operation setting data inputted from outside and outputs the operation setting data. The collective-reflection processing unit collectively latches the operation setting data latched by and outputted from the data holding unit in synchronism with the reflection timing control signal, and outputs the latched operation setting data to the driving section. The reflection timing control signal output unit receives a vertical synchronization signal and an end-of-communication signal representative of an end of communication of a series of operation setting data from outside, and outputs the reflection timing control signal to the collective-reflection processing unit in synchronism with the vertical synchronization signal after the end-of-communication signal is received.

In another embodiment of the present invention, there is provided a solid-state imaging device which includes a reflection timing control signal output unit, a data holding unit, a collective-reflection processing unit. The reflection timing control signal control signal output unit outputs a reflection timing control signal for controlling a timing of outputting operation setting data for a device to a driving section of the device. The data holding unit latches the operation setting data inputted from outside and outputs the operation setting data. The collective-reflection processing unit collectively latches the operation setting data latched by and outputted from the data holding unit in synchronism with the reflection timing control signal, and outputs the latched operation setting data to the driving section. The reflection timing control signal output unit includes a first output unit and a second output unit. The first output unit receives a vertical synchronization signal and an end-of-communication signal representative of an end of communication of a series of operation setting data from outside, and outputs a first enable signal in synchronism with the vertical synchronization signal after the end-of-communication signal is received. The second output unit counts a number of frames required for an operation mode requiring a single or a plurality of frames during operation of the operation mode, and outputs a second enable signal when the number of frames required for the operation mode is counted up. The reflection timing control signal is outputted to the collective-reflection processing unit when the first output unit outputs the first enable signal and the second output unit outputs the second enable signal.

In still another embodiment of the present invention, there is provided an imaging apparatus which includes an imaging section using a solid-state imaging device, a control section for controlling the imaging section, and an operation section for operating the imaging section. The solid-state imaging device includes a reflection timing control signal output unit, a data holding unit, and a collective-reflection processing unit. The reflection timing control signal output unit outputs a reflection timing control signal for controlling a timing of outputting operation setting data for a device to a driving section of the device. The data holding unit latches the operation setting data inputted from outside and outputs the operation setting data. The collective-reflection processing unit collectively latches the operation setting data latched by and outputted from the data holding unit in synchronism with the reflection timing control signal, and outputs the latched operation setting data to the driving section. The reflection timing control signal output unit receives a vertical synchronization signal and an end-of-communication signal representative of an end of communication of a series of operation setting data from outside, and outputs the reflection timing control signal to the collective-reflection processing unit in synchronism with the vertical synchronization signal after the end-of-communication signal is received.

According to embodiments of the solid-state imaging device and imaging apparatus, the data holding unit latches operation setting data received from outside. The data latched by the data holding unit is collectively outputted to the driving section in synchronism with a reflection timing control signal outputted from the reflection timing control signal output unit. The reflection timing control signal output unit outputs the reflection timing control signal to the collective-reflection processing unit in synchronism with a vertical synchronization signal after an end-of-communication signal is received.

Accordingly, after the end-of-communication signal is received, the operation setting data can be collectively latched by the collective-reflection processing unit on the basis of the reflection timing control signal issued in synchronism with the vertical synchronization signal. Thus, the constraint in the known technique to perform communication for operation setting data within a repetition period of vertical synchronization signal is eliminated, and a large amount of communication for operation setting data can be accomplished independently of the repetition period of vertical synchronization signal.

Furthermore, according to one embodiment of the solid-state imaging device, the data holding unit latches operation setting data received from outside. The data latched by the data holding unit is collectively outputted to the driving section in synchronism with a reflection timing control signal outputted from the reflection timing control signal output unit. The reflection timing control signal output unit outputs a first enable signal in synchronism with a vertical synchronization signal after an end-of-communication signal is received, and the second output unit outputs a reflection timing control signal to the collective-reflection processing unit when the number of frames required for the operation mode is counted up and thus a second enable signal is outputted during operation.

Accordingly, even if the end-of-communication signal is issued during operation, the reflection timing control signal is outputted after the number of frames required for the operation is counted up and thus after the operation is completed. Thus, there is no likelihood that operation setting data will be latched by the collective-reflection processing unit at any point along an operation requiring a single or a plurality of frames. Consequently, invalid frames do not occur.

The above summary of the present invention is not intended to describe each illustrated embodiment or every implementation of the present invention. The figures and the detailed description which follow more particularly exemplify these embodiments.

DETAILED DESCRIPTION OF EMBODIMENTS

First Embodiment

A solid-state imaging device and an imaging apparatus according to embodiments of the present invention will be described below with reference to the drawings.

Figure 1:
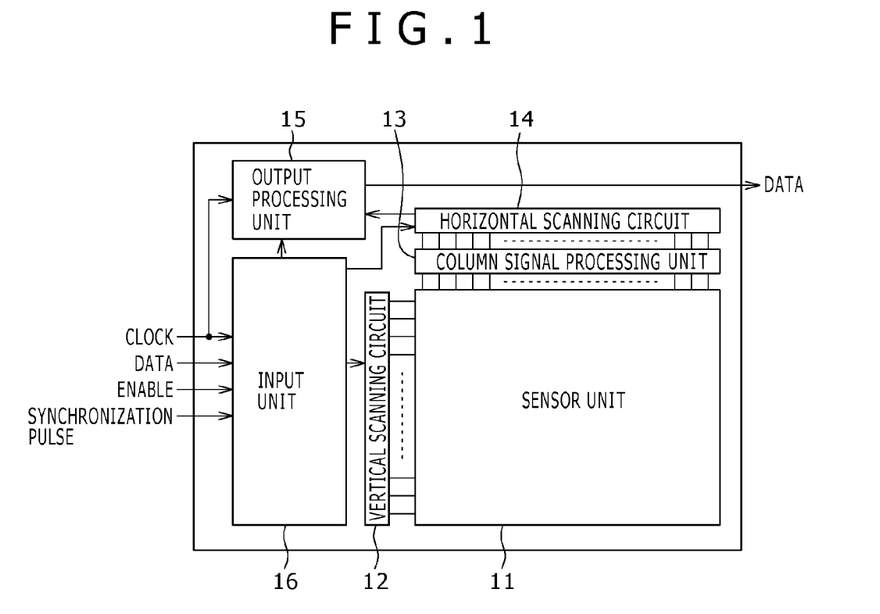
FIG. 1 is a block diagram showing a schematic configuration of a solid-state imaging device according to a first embodiment.

FIG. 1 is a block diagram showing a schematic configuration of a solid-state imaging device according to a first embodiment.

As shown in FIG. 1, the solid-state imaging device is of a CMOS type, and includes a sensor unit 11, a vertical scanning circuit 12, a column signal processing unit 13, a horizontal scanning circuit 14, an output processing unit 15, and an input unit 16.

The sensor unit 11 includes a plurality of pixels (not shown) arranged in a matrix form, and constitutes an imaging area. The vertical scanning circuit 12 controls reading operation on each pixel signal by reading and scanning pixels in a vertical direction. The column signal processing unit 13 receives the pixel signals obtained through vertical signal lines, by one row at a time, performs a predetermined signal processing for each column, and temporarily holds the resultant signals. The column signal processing unit 13 includes one or both of, e.g., a correlated double sampling (CDS) circuit and an analog-to-digital Converter (ADC) circuit for each column. The CDS circuit removes noise by correlated double sampling processing on the pixel signals. The ADC circuit converts analog pixel signals into digital signals. The horizontal scanning circuit 14 scans the pixel signals held in the column signal processing unit 13 in a horizontal direction and outputs the resultant signals. The output processing unit 15 performs a predetermined processing on the pixel signals scanned in the horizontal direction by the horizontal scanning circuit 14, and outputs the resultant signals to outside. The output processing circuit 15 includes, e.g., a gain control circuit and a color processing circuit. The input unit 16 receives operation setting data for the solid-state imaging device, and outputs the received operation setting data to a driving section of the device, i.e., the sensor unit 11, vertical scanning circuit 12, column signal processing unit 13, horizontal scanning circuit 14, and output processing unit 15.

Figure 2:
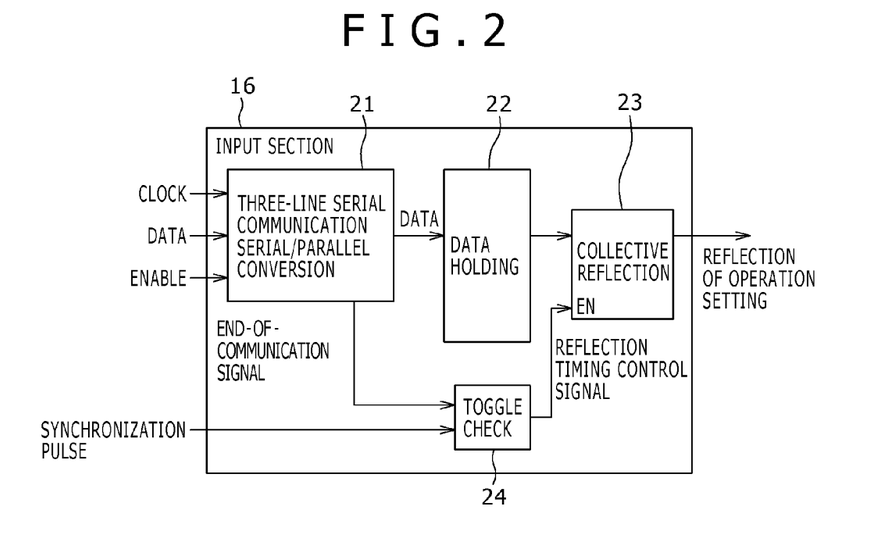
FIG. 2 is a block diagram showing a configuration of an input section shown in FIG. 1.

FIG. 2 is a block diagram showing a configuration of the input section shown in FIG. 1.

As shown in FIG. 2, the input section 16 includes a three-line serial communication serial/parallel conversion unit 21, a data holding unit 22, a collective-reflection processing unit 23, and a toggle check unit 24.

The three-line serial communication serial/parallel conversion unit 21 receives operation setting data for the solid-state imaging device from outside as serial data, converts the serial data into parallel data, and outputs the parallel data. The data holding unit 22 includes a register for each address, and holds (latches) the operation setting data from the three-line serial communication serial/parallel conversion unit 21 in the registers. The collective-reflection processing unit 23 includes a register for each address, collectively holds (latches) the operation setting data held in the data holding unit 22 and outputs the operation setting data to the driving section of the device in synchronism with a reflection timing control signal from the toggle check unit 24. The toggle check unit 24 receives a vertical synchronization signal and an end-of-communication signal representative of an end of communication of a series of operation setting data from outside, and outputs a reflection timing control signal to the collective-reflection processing unit in synchronism with the vertical synchronization signal after the end-of-communication signal is received. The end-of-communication signal indicates the end of communication of the series of operation setting data when the signal itself is inverted, i.e., the signal goes to a high(H) level from a low(L) level, and when the signal goes to the L level from the H level.

Figure 3:
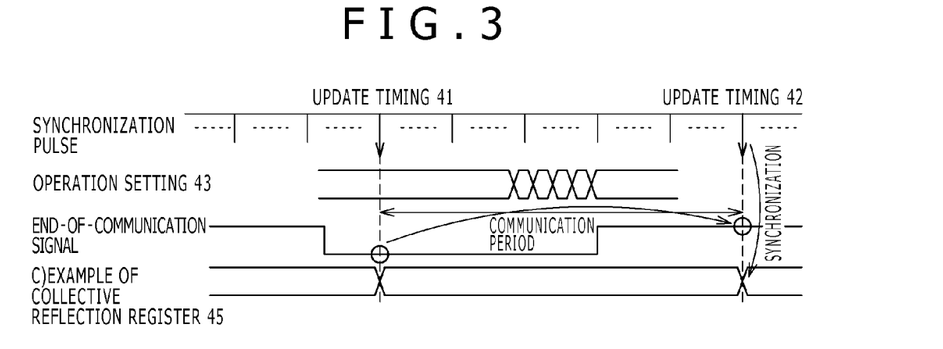
FIG. 3 illustrates a timing diagram showing a method of setting timings for reflecting operation settings.

FIG. 3 illustrates a timing diagram showing a method of setting timings for reflecting operation settings.

As shown in FIG. 3, in the solid-state imaging device thus constructed, a series of operation setting data is supplied to the three-line serial communication serial/parallel conversion unit 21, subjected to serial-to-parallel conversion, and held in the registers of the data holding unit 22. Then, when a reflection timing control signal is outputted in synchronism with a vertical synchronization signal after an end-of-communication signal is inverted by the toggle check unit 24, the operation setting data held in the registers of the data holding unit 22 is latched in the registers of the collective-reflection processing unit 23 and outputted to the driving section of the device.

In FIG. 3, the end-of-communication signal is inverted from the H level to the L level before an update timing 41 being a vertical synchronization signal issuing timing, thereafter the reflection timing control signal is outputted by the toggle check unit 24 at the update timing 41 for issuing a subsequent vertical synchronization signal, and the operation setting data is collectively latched by the collective-reflection processing unit 23 and outputted to the driving section.

At a next timing, communication of another operation setting data is performed between the update timing 41 and an update timing 42, and the operation data supplied from the three-line serial communication serial/parallel conversion unit 21 is held in the data holding unit 22. The end-of-communication signal is inverted from the L level to the H level before the update timing 42 which is a vertical synchronization signal issuing timing, thereafter a reflection timing control signal is outputted from the toggle check unit 24 at the update timing 42 for issuing a subsequent vertical synchronization signal, and the operation setting data is collectively latched by the collective-reflection processing unit 23 and outputted to the driving section.

According to the first embodiment, after an end-of-communication signal is received, operation setting data held in the data holding unit 22 can be latched collectively by the collective-reflection processing unit 23 on the basis of a reflection timing control signal issued in synchronism with a vertical synchronization signal. This eliminates the conventional limits that the communication for operation setting data is performed within the vertical synchronization signal repeating period, and thus the communication for a large amount of operation setting data can be performed independently of the vertical synchronization signal repeating period and without limits on the communication period.

Second Embodiment

There may be a case where a solid-state imaging device requires operation handling a plurality of frames, such as adding a plurality of frames, so as to increase a dynamic range, in the operation modes. In such a case, if operation setting data held in the data holding unit 22 is collectively latched by the collective-reflection processing unit 23 on the basis of a reflection timing control signal at some point along the operation as in the first embodiment, frames subsequent to that point are subjected to a new operation setting, thereby causing invalid frames in some cases. The second embodiment is intended to overcome this issue.

Figure 4:
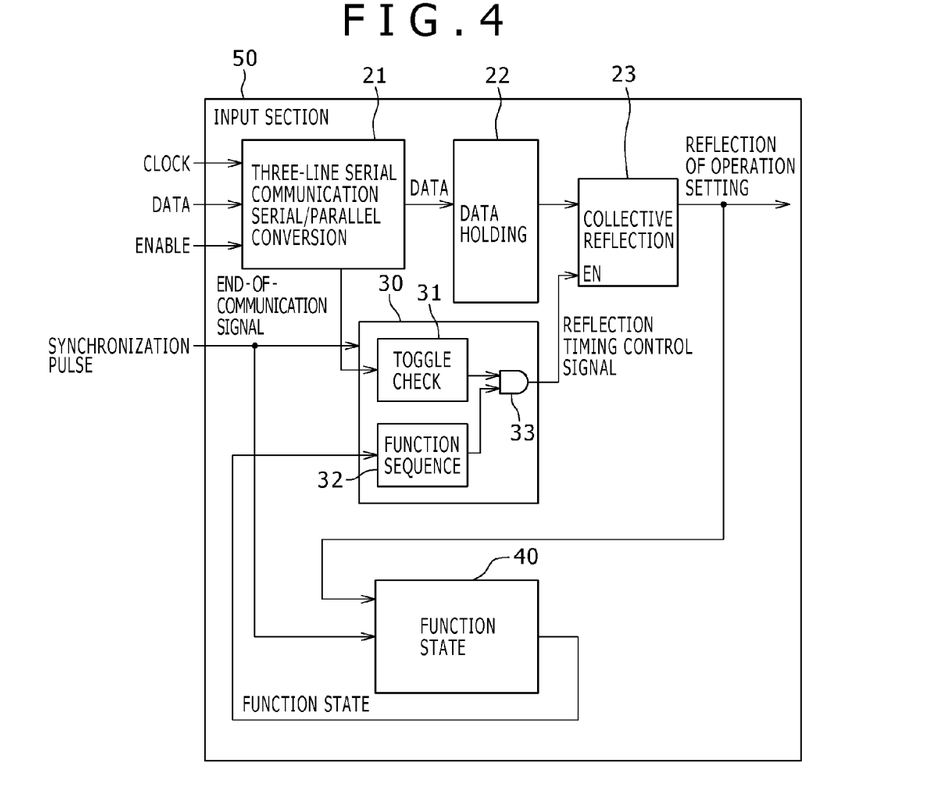
FIG. 4 is a block diagram showing a configuration of an input section of a solid-state imaging device according to a second embodiment.

FIG. 4 is a block diagram showing a configuration of an input section of a solid-state imaging device according to the second embodiment.

As shown in FIG. 4, an input section 50 of the solid-state imaging device is formed by adding a function state unit 40, a function sequence unit 32, and an AND circuit 33 to the input section 16 of the first embodiment, and has a three-line serial communication serial/parallel conversion unit 21, a data holding unit 22, a collective-reflection processing unit 23, a reflection timing control signal output unit 30, and the function state unit 40.

The three-line serial communication serial/parallel conversion unit 21 receives operation setting data for the solid-state imaging device from outside as serial data, converts the serial data into parallel data, and outputs the parallel data. The data holding unit 22 includes a register for each address, and holds (latches) the operation setting data from the three-line serial communication serial/parallel conversion unit 21 in the registers. The collective-reflection processing unit 23 has a register for each address, collectively holds (latches) the operation setting data held in the data holding unit 22, and outputs the operation setting data to a driving section of the device in synchronism with a reflection timing control signal from the reflection timing control signal output unit 30.

The function state unit 40 counts, during execution of an operation of the device, the number of frames required for this operation mode. The reflection timing control signal output unit 30 includes a toggle check unit 31, a function sequence unit 32, and an AND circuit 33. The toggle check unit 31 receives a vertical synchronization signal and an end-of-communication signal representative of an end of communication of a series of operation setting data from outside, and after the end-of-communication signal is received, the toggle check unit 31 outputs a first enable signal to the AND circuit 33 in synchronism with the vertical synchronization signal. The end-of-communication signal indicates the end of communication of the series of operation setting data when the signal is inverted, i.e., when the signal goes to the H level from the L level and goes to the L level from the H level.

When the function state section 40 counts the number of frames required for the operation, specifically, when the counting is performed as 0, 1, 2, 3 (e.g., for four frames) and then the count returns to 0, the function sequence unit 32 recognizes an end of an operation mode, and outputs a second enable signal to the AND circuit 33. When the first enable signal is outputted from the toggle check unit 31 and the second enable signal is outputted from the function sequence section 32, the AND circuit 33 outputs a reflection timing control signal to the collective-reflection processing unit 23.

Figure 5:
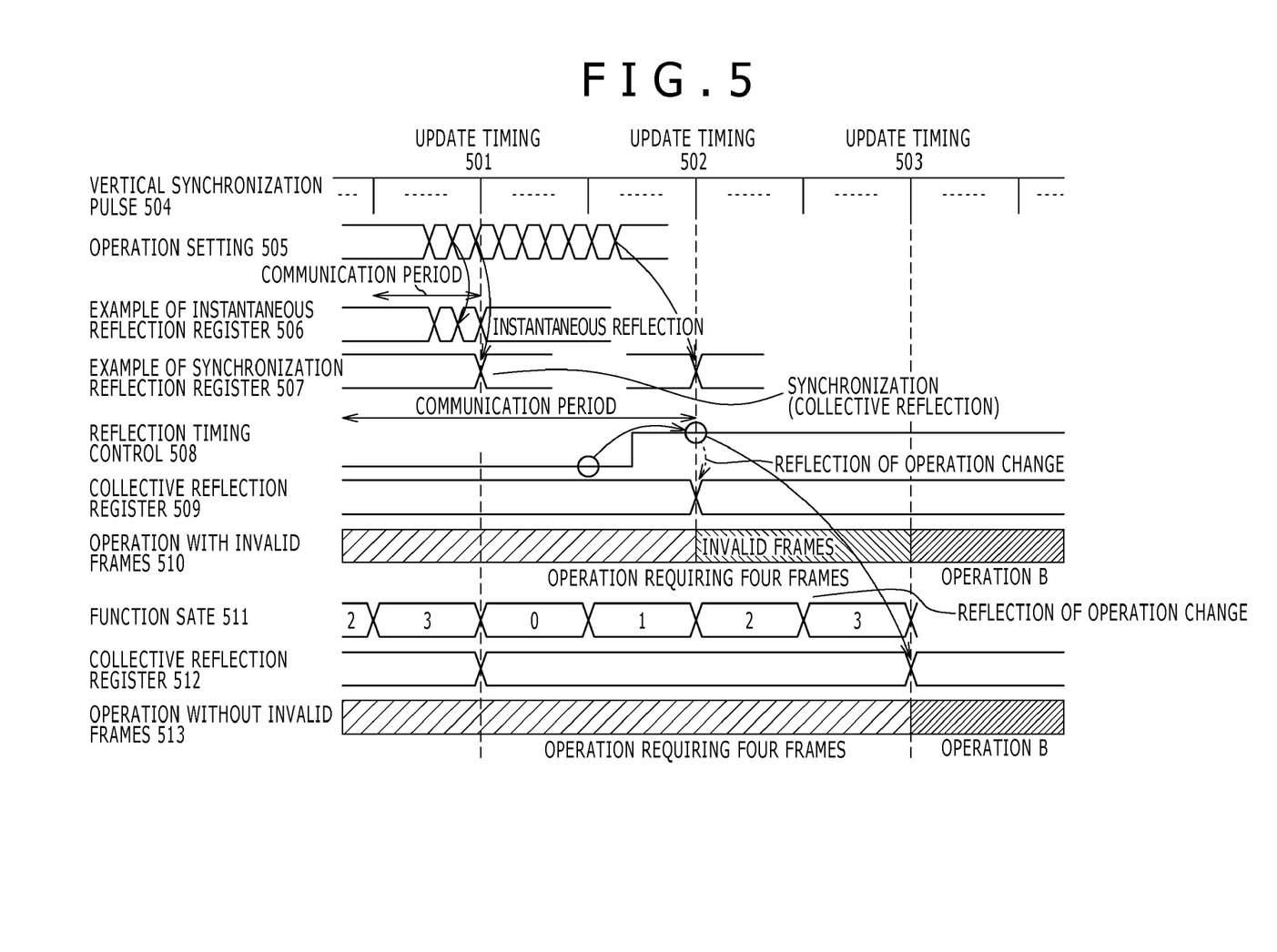
FIG. 5 illustrates a timing diagram showing a method of setting timings for reflecting operation settings.

FIG. 5 illustrates a timing diagram showing a method of setting timings for reflecting an operation setting.

As shown in FIG. 5, it is assumed that communication of a series of operation setting data is started before an update timing 501 at which a vertical synchronization signal is issued, and that the communication before an update timing 502 at which a vertical synchronization signal is ended. Since an end-of-communication signal remains unchanged (is not inverted) before the update timing 501, the operation setting data supplied from the three-line serial communication serial/parallel conversion unit 21 is held in the data holding unit 22, but is not held in the collective-reflection processing unit 23.

Since the end-of-communication signal changes from the L level to the H level before an update timing 502, the first enable signal is outputted from the toggle check unit 31. At this time, the function state unit 40 is counting the number of frames required for an operation mode of an operation under execution. Since the count is changing from 1 to 2, the function sequence unit 32 does not output a second enable signal, so that the AND circuit 33 does not output a reflection timing control signal. If the reflection timing control signal is outputted at this time, invalid frames will occur due to the previous operation in progress.

At an update timing 503 at which a vertical synchronization signal is issued, the function state unit 40 counts the number of frames (four frames) required for the operation under execution, i.e., the count returns to 0 from 3, upon which the function sequence unit 32 outputs the second enable signal. Accordingly, the AND circuit 33 outputs a reflection timing control signal to the collective-reflection processing unit 23, so that the series of operation setting data held in the registers of the data holding unit 22 is latched by the collective-reflection processing unit 23, and outputted to the driving section.

According to the second embodiment, even if an end-of-communication signal is issued during operation, the function state unit 40 counts the number of frames required for the operation, and the AND circuit 33 of the reflection timing control signal output unit 30 outputs a reflection timing control signal after the operation is completed. Thus, there is no likelihood that operation setting data will be latched by the collective-reflection processing unit 23 at any point along an operation requiring a single or a plurality of frames. Accordingly, no invalid frame occurs.

Third Embodiment

A specific embodiment of an imaging apparatus to which the present invention is applied will be described below.

Figure 6:
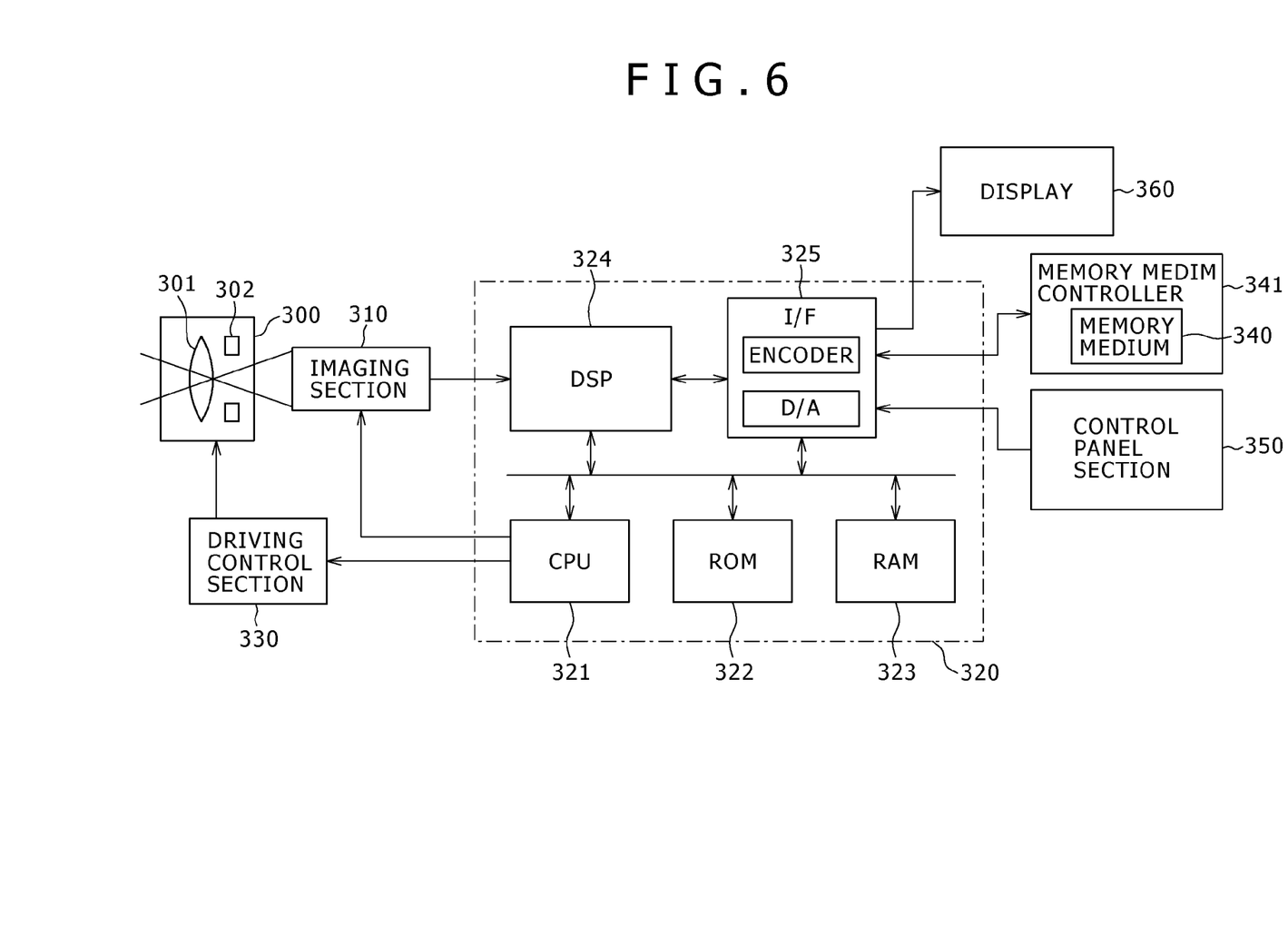
FIG. 6 is a block diagram showing a configuration of an imaging apparatus according to a third embodiment.

FIG. 6 is a block diagram showing a configuration example of a camera apparatus using a CMOS image sensor according to this embodiment.

In FIG. 6, an imaging section 310 takes an image of an object using, e.g., the CMOS image sensor shown in FIG. 1, and outputs an imaging signal to a system control section 320 incorporated in a main board. Namely, in the imaging section 310, processing, such as auto-gain control(AGC), optical black(OB) clamping, correlated double sampling(CDS), and A/D conversion, is performed on the output signal from the CMOS image sensor described above, to generate and output a digital image capture signal.

In the example, an imaging signal is converted into a digital signal within the imaging section 310 and outputted to the system control section 320 is shown in the present embodiment. However, it may alternatively be configured such that the imaging section 310 delivers an analog imaging signal to the system control section 320, and the analog signal is converted into a digital signal at the system control section 320. Furthermore, various methods may be used for the processing within the imaging section 310, and are not, of course, particularly limited.

Furthermore, an image capture optical system 300 includes a zoom lens 301, an aperture mechanism 302, and the like arranged within a lens-barrel, and forms an object image on a light-receiving part of the CMOS image sensor. Under the control of a driving control section 330 based on instructions from the system control section 320, the image capture optical system 300 mechanically drives its various parts to perform control such as autofocusing.

Furthermore, the system control section 320 includes a CPU 321, a ROM 322, a RAM 323, a DSP 324, an external interface 325, and the like.

The CPU 321 delivers instructions to the various parts of the camera apparatus using the ROM 322 and the RAM 323, to control the entire system.

The DSP 324 performs various signal processing on the image capture signal from the imaging section 310 to generate video signals (e.g., YUV signals or the like) of a still picture or a moving picture in a predetermined format.

The external interface 325 is provided with various components such as an encoder and a D/A converter, and exchanges various control signals and data with external components (a display 360, a memory medium 340, and an operation panel section 350 in this embodiment) connected to the system control section 320.

The display 360 is a small-sized display unit such as, e.g., a liquid crystal display panel, incorporated into the camera apparatus, and displays an image picked-up. In addition to such a small-sized display unit incorporated into the camera apparatus, it may be configured to transmit image data to an external large-sized display apparatus, and display the transmitted image data on the apparatus.

The memory medium 340 allows the picked-up image to be suitably stored in, e.g., various memory cards and the like. For example, a memory medium controller 341 allows interchange of one memory medium with another thereon. The memory medium 340 may include, in addition to the various memory cards, disk media such as magnetic disk and optical disc.

The operation panel section 350 is provided with input keys through which a user gives various instructions for performing image capture operation with the camera apparatus. The CPU 321 monitors input signals from this operation panel section 350, and performs various operation control based on what is instructed.

By applying the present invention to such a camera apparatus, high-quality image capture can be performed on various objects. In the above configuration, the method of combining a unit device and a unit module which are components of the system, the scale of a set, and the like may be suitably selectable on the basis of commercialization needs and the like, and thus the imaging apparatus according to embodiments of the present invention includes a wide variety of modifications.

Furthermore, in the solid-state imaging device and the imaging apparatus according to embodiments of the present invention, objects for image capture may not be limited to typical scenes such as persons and scenery, but may include special minuscule image patterns for, e.g., counterfeit note detectors, fingerprint detectors, and the like. In such a case, the apparatus is not configured as the typical camera apparatus shown in FIG. 6, but should include a special image capture optical system and a signal processing system covering pattern analysis. In this case also, precision image detection can be achieved with advantages of an embodiment of the present invention fully utilized.

Furthermore, to constitute a remote system, such as for remote medical care, crime prevention monitoring, or personal authentication, the apparatus may include a communication module connected to a network, and thus extensive applications may be achievable.

It should be understood by those skilled in the art that various modifications, combinations, sub-combinations and alternations may occur depending on design requirements and other factors insofar as they are within the scope of the appended claims or equivalents thereof.

What is claimed is:

1. A solid-state imaging device comprising:
   a reflection timing control signal output unit configured to output a reflection timing control signal for controlling a timing of outputting operation setting data for a device to a driving section of the device;
   a data holding unit configured to latch the operation setting data inputted from outside and to output the operation setting data; and
   a collective-reflection processing unit configured to collectively latch the operation setting data latched by and outputted from the data holding unit in synchronism with the reflection timing control signal, and output the latched operation setting data to the driving section,
   wherein the reflection timing control signal output unit receives a vertical synchronization signal and an end-of-communication signal representative of an end of communication of a series of operation setting data from outside, and outputs the reflection timing control signal to the collective-reflection processing unit in synchronism with the vertical synchronization signal after the end-of-communication signal is received.

2. A solid-state imaging device comprising:
   a reflection timing control signal output unit configured to output a reflection timing control signal for controlling a timing of outputting operation setting data for a device to a driving section of the device;
   a data holding unit configured to latch the operation setting data inputted from outside and output the latched operation setting data; and
   a collective-reflection processing unit configured to collectively latch the operation setting data outputted from the data holding unit in synchronism with the reflection timing control signal, and output the latched operation setting data to the driving section,
   wherein the reflection timing control signal output unit includes:
      a first output unit configured to receive a vertical synchronization signal and an end-of-communication signal representative of an end of communication of a series of operation setting data from outside, and output a first enable signal in synchronism with the vertical synchronization signal after the end-of-communication signal is received;
      a second output unit configured to count a number of frames required for an operation mode requiring a single or a plurality of frames during operation of the operation mode, and output a second enable signal when the number of frames required for the operation mode is counted up, and
   when the first output unit outputs the first enable signal and the second output unit outputs the second enable signal, the reflection timing control signal is outputted to the collective-reflection processing unit.

3. The solid-state imaging device according to claim 1 or 2, wherein the driving section includes a sensor unit including a plurality of pixels, a vertical scanning circuit for reading pixel signals from the pixels of the sensor unit and scanning the pixel signals in a vertical direction, a horizontal scanning circuit for scanning the pixel signals scanned by the vertical scanning circuit in a horizontal direction, and an output circuit for performing a predetermined signal processing on the pixel signals scanned by the horizontal scanning circuit.

4. An imaging apparatus:
   an imaging section using a solid-state imaging device;
   a control section for controlling the imaging section; and
   an operation section for operating the imaging section,
   wherein the solid-state imaging device includes:
      a reflection timing control signal output unit configured to output a reflection timing control signal for controlling a reflection timing of outputting operation setting data for a device to a driving section of the device;
      a data holding unit configured to latch the operation setting data inputted from outside and to output the operation setting data; and
      a collective-reflection processing unit configured to collectively latch the operation setting data latched by and outputted from the data holding unit in synchronism with the reflection timing control signal, and output the latched operation setting data to the driving section,
   wherein the reflection timing control signal output unit receives a vertical synchronization signal and an end-of-communication signal representative of an end of communication of a series of operation setting data from outside, and outputs the reflection timing control signal to the collective-reflection processing unit in synchronism with the vertical synchronization signal after the end-of-communication signal is received.

* * * * *